July 13, 1965    J. B. SMITH    3,193,990
OIL TREATING APPARATUS FOR SEPARATING OIL, GAS AND WATER
Filed Aug. 4, 1961    3 Sheets-Sheet 1

INVENTOR.
JAMES B. SMITH
BY
ATTORNEY

July 13, 1965  J. B. SMITH  3,193,990
OIL TREATING APPARATUS FOR SEPARATING OIL, GAS AND WATER
Filed Aug. 4, 1961  3 Sheets-Sheet 2

INVENTOR.
JAMES B. SMITH
BY
William C. Babcock
ATTORNEY

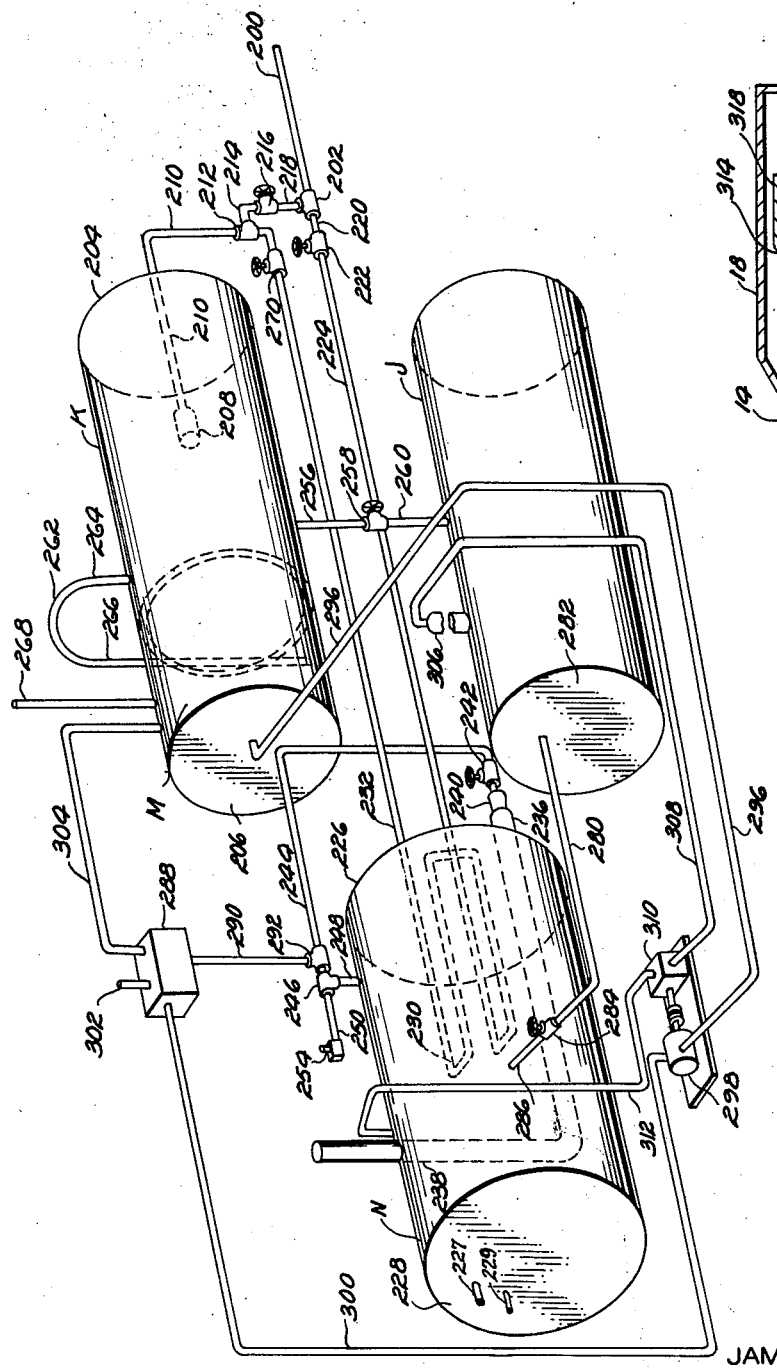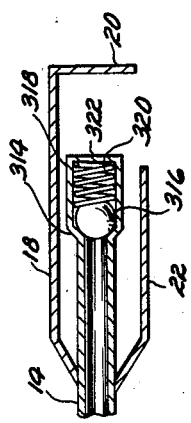

United States Patent Office 3,193,990
Patented July 13, 1965

3,193,990
OIL TREATING APPARATUS FOR SEPARATING OIL, GAS AND WATER
James Bernard Smith, 209 S. Church, Aztec, N. Mex.
Filed Aug. 4, 1961, Ser. No. 129,321
9 Claims. (Cl. 55—175)

The present invention relates generally to oil field equipment, and more particularly to an apparatus for separating the discharged stream from a well into oil, gas and water.

The stream of fluid produced by a particular well may include oil, gas and water in varying proportions, and the temperature and pressure of this fluid stream are that characteristic of the well. The oil and water so produced are frequently in the form of an emulsion, but in order for the oil and gas to be saleable they must be separated from one another, as well as from the water with which they are normally associated.

Within the earth formation wherein the stream of fluid of the character described originates, the fluid is normally under substantial pressure, and the gas is at least partially retained in the emulsion in an occluded condition. As fluid rises toward the earth's surface in a well bore, the pressure on the fluid decreases whereby the occluded gas tends to separate from the oil and water. For many years it has been customary to provide apparatus at or adjacent one or more well heads to handle the fluid discharged therefrom and separate it into oil, gas and water.

Equipment available heretofore for the separation of well fluid into gas, oil and water has, in the main, been unsatisfactory as it did not perform with equal efficiency with change of the seasons, variation in the pressure and temperature during discharge thereof from the well, and furthermore, was structurally complicated and uneconomical to operate due to its high fuel or power requirements. The disadvantages of such prior equipment was, to a degree, partially rectified by the apparatus disclosed and claimed in my United States Letters Patent No. 2,863,522 entitled Oil and Gas Treater which issued December 9, 1958. The invention disclosed and claimed in the present application is an improvement over said oil and gas treater, in that it is of simpler construction, more economical to operate, and is more versatile in the uses to which it may be put, as well as the conditions under which it can operate efficiently.

A major object of the present invention is to provide an apparatus that operates with maximum economy in separating well fluid into oil, gas and water, with the gas so separated being used either to power the apparatus to continue the separating process, or transferred to a location apart from that of the apparatus to be used for commercial purposes.

A further object of the invention is to provide a method of separating well fluid into oil, gas and water by which after the well fluid has been raised to a desired temperature it is expanded in a confined space to a first pressure to effect the major separation of the gas from a liquid phase of the well fluid containing oil, water and some occluded gas, with the liquid phase thereafter being heated in another confined space at a second pressure lower than that of the first pressure wherein separation of the liquid phase into separate oil and water strata is obtained.

Yet another object of the invention is to supply an apparatus of the character described which so controls the pressures and temperatures as the well fluid flows therethrough that a sharp separation of the oil, gas and water is obtained, with substantially all gas discharged with the well fluid either being recovered for the commercial sale thereof, or used in powering the apparatus during the separation process.

A still further object of the invention is to provide an apparatus of the nature described that is sufficiently compact and light in weight as to be mountable on a skid or other movable platform and moved from site to site in an oil field where required.

These and other objects and advantages of the present invention will become apparent from the following description thereof, and from the accompanying drawings illustrating the same in which:

FIGURE 5 is a perspective view of a fourth alternate form of apparatus by which well fluid is separated into oil, gas and water, with which only one heater is used rather than the two shown in FIGURE 1; and FIGURE 6 is a transverse cross-sectional view of an expander adapted to be used in the preferred, first and fourth alternate forms of the invention.

Figure 1:
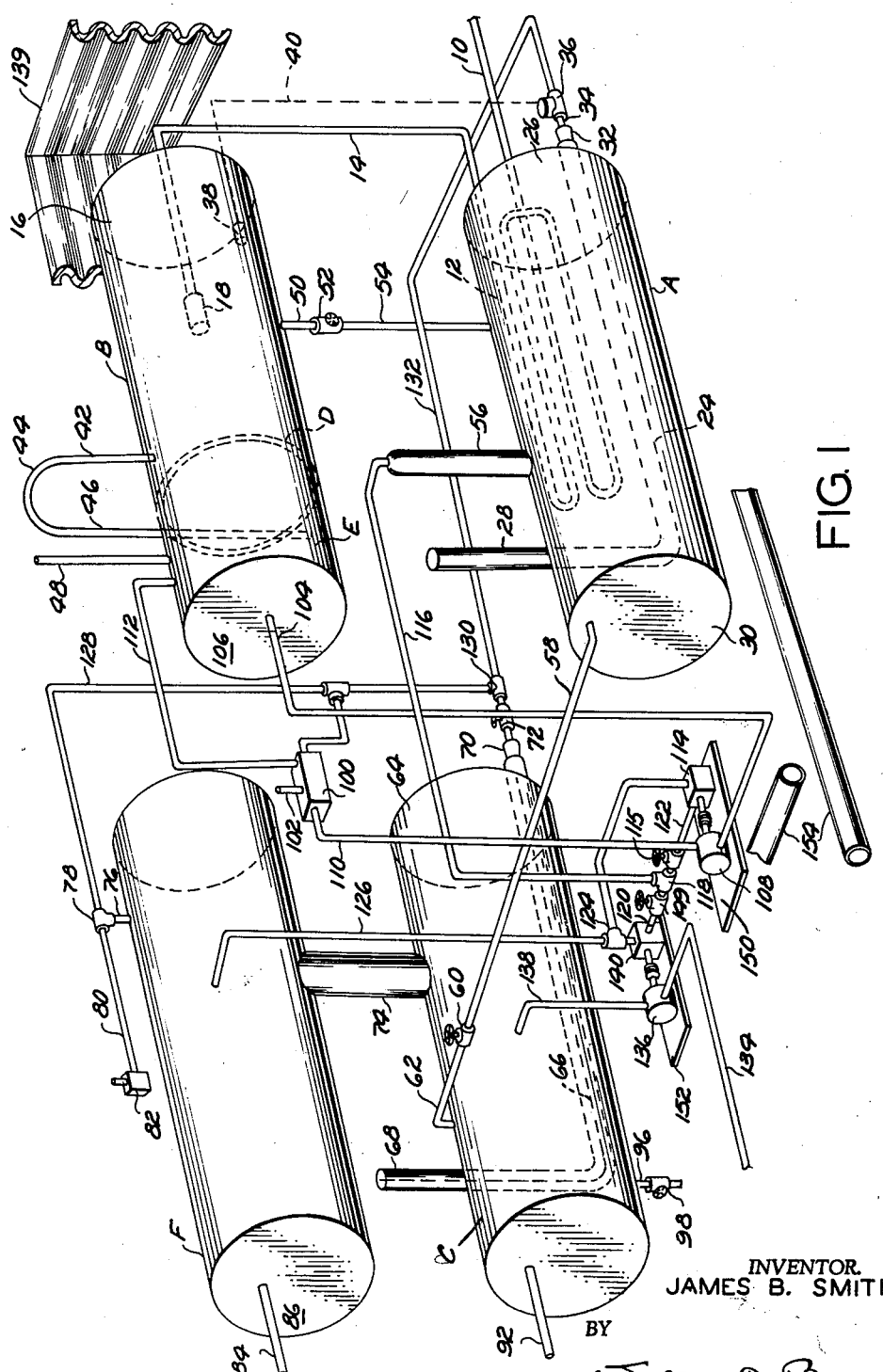
FIGURE 1 is a perspective view of a preferred form of the invention by which a two-stage separation of well fluid into gas, oil and water can be effected.

Referring now to FIGURE 1 of the drawings for the general arrangement of the preferred form of the invention, it will be seen to include a first closed vessel A, a second closed vessel B, and a third closed vessel C. By use of a partition D transversely disposed therein, vessel B can be caused to define a fourth closed vessel E. If desired, vessel E can be formed separate and apart from vessel B, as will become apparent hereinafter.

Fluid from a producing well which includes comingled oil, water and gas, is discharged towards the apparatus of the present invention through a pipe 10 that is connected to a coiled heat exchanger tube 12 located within the confines of the first vessel A. After traversing the heat exchange coil 12 the well fluid discharges therefrom into a tube 14 that extends upwardly into the second vessel B through the end 16 of this vessel. Tube 14 terminates in an expander 18, the detailed structure of which is shown in FIGURE 6.

The purpose of expander 18 is to form the well fluid into a spray as it discharges therethrough, as well as to allow the gas accompanying the fluid to expand to a first pressure within the confines of vessel B. This expansion of the gas to this first pressure is accompanied by a cooling of both the gas and the spray fluid to a first temperature within the confines of second vessel B that is lower than that possessed by the well fluid as it discharges from the heat exchange coil 12. If desired, baffles 20 and 22 can be provided with expander 18 (FIGURE 6) against which the sprayed fluid impinges prior to dropping down into the lower portion of the second vessel B by the force of gravity.

As the gas separates from the well fluid within the confines of vessel B it is withdrawn therefrom by means to be described hereinafter, to maintain a first pressure within the confines of this second vessel. During discharge of the gas embodied in the well fluid through the expander 18, the expansion from the pressure under which the gas was maintained in tube 14 and the first pressure maintained in vessel B may be so great that the well fluid would freeze as it discharges from the expander were means not provided to prevent occurrence of this contingency. Therefore, it is desirable that sufficient heat be applied to the coiled heat exchanger tube 12 that the well fluid temperature during discharge thereof through expander 18 will be sufficiently high to prevent freezing of the fluid as the gas embodied therein expands within the confines of second vessel B. Heating of heat exchanger 12 as well as the well fluid flowing therethrough is conveniently accomplished by providing an elongate heater tube 24 which extends longitudinally through end 26 of first vessel A, which tube develops into an upwardly extending stack 28 located adjacent the opposite end 30 of vessel A.

The outer projecting end of the heater tube 24 is provided with a burner 32 which is adapted to utilize gas delivered thereto to heat tube 24, the interior of vessel A, and the coiled heat exchanger tube 12. Burner 32 is connected by a pipe 34 to a thermostatically controlled valve 36 of conventional design that is actuated by a thermostat 38 situated within the confines of second vessel B and connected to valve 36 by a line 40 shown in dotted line in FIGURE 1. When the temperature within the confines of vessel B drops below a first predetermined temperature, the thermostat 38 causes the valve 36 to open further to admit more gas into burner 32, increase the temperature of the fluid flowing through the heat exchanger 12, and thus minimize the cooling effect that will be obtained as the gas associated with this fluid expands in second vessel B. When the temperature in vessel B rises above the first predetermined temperature, the thermostatic element 38 actuates the valve 36 to lessen the flow of gas passing therethrough, whereby the fluid passing through the heat exchanger tubes 12 is not heated to as high a temperature as previously, and a greater cooling effect is obtained as the gas associated with this fluid expands within the vessel B, with this expansion tending to cool the interior of the second vessel and return it to the first predetermined temperature.

Gas that separates from the well fluid within the second vessel B can flow outwardly from the second vessel through a first leg 42 of an inverted U-shaped tube 44, as shown in FIGURE 1. A second leg 46 of tube 44 enters the fourth vessel E through the top thereof, and projects downwardly therein to a position adjacent the lower interior surface of the fourth vessel. Vessel E is filled with a water or moisture-absorbing material such as glycol, and as the gas discharges from the lower end of the second leg 46 is must bubble upwardly therethrough prior to discharging through a tube 48 connected to the upper interior portion of the fourth vessel E. Tube 48 serves to conduct gas flowing from vessel E to a location (not shown) remote from the apparatus where the gas passes into a gas transmission line, storage tank, or the like. The first liquid phase of the well fluid that separates from the gas in the second vessel B can discharge therefrom through a tube 50 which extends downwardly from the lower portion of the vessel. Tube 50 is connected to a valve 52 from which a tube 54 leads to the upper interior portion of the first vessel A.

The first liquid phase discharges through tube 54 into vessel A where it is sufficiently heated by tube 24 and heat exchanger tubes 12 that at least a portion of the occluded gas therein escapes therefrom into the upper portion of vessel A. It will be noted that vessel A preferably includes an elongate upwardly extending dome 56 that is at all times filled with gas that is at substantially the same pressure as the gas which escapes from the second vessel B through tube 44. The purpose of dome 56 will be explained in detail hereinafter.

The first liquid phase in vessel A, minus the occluded gas that has escaped therefrom, may flow through a tube 58 to a back pressure valve 60, from which a tube 62 extends to the upper interior portion of the third vessel C. A second pressure is maintained in the interior of vessel C that is lower than the first pressure maintained in the first vessel A and second vessel B. Vessel C has an end 64 through which a heater pipe 66 enters the third vessel to extend longitudinally along the lower portion of the vessel and thereafter develop into an upwardly extending stack 68, as may best be seen in FIGURE 1. Heater pipe 66 is provided with a burner 70 on the outer end thereof adjacent the end 64 of the third vessel C. Burner 70 is connected to a valve 72 that regulates the rate at which gas can flow to the burner to heat the tube 66. The third vessel C preferably has a large tubular riser 74 projecting upwardly therefrom to the lower portion of an auxiliary tank F (FIGURE 1).

The back pressure valve 60 serves as a barrier to separate the apparatus into the vessels A, B and E, the interiors of which are maintained at substantially the first pressure, with a second pressure being maintained in the interior of vessels C and F at a second pressure that is substantially lower than the first pressure. Due to the fact that the second pressure maintained in the interior of third vessel C and auxiliary vessel F is substantially less than the first pressure, and also the first liquid phase therein is heated to a second temperature that is greater than the first temperature of the first liquid phase when in first vessel A, a further separation of occluded gas from the first liquid phase occurs in vessel C. As the occluded gas separates from the first liquid phase in vessel C it passes upwardly in the form of bubbles through the riser 74 into the upper confines of the vessel F. As the gas accumulates in the upper portion of vessel F it can flow therefrom through a tube 76, which tube by means of a T connection 78 is connected to a tube 80 leading to a normally closed pressure relief valve 82. However, when the pressure in vessels C and F rises above the second predetermined pressure, the relief valve 82 opens to permit discharge of gas from the auxiliary vessel F through tubes 76 and 80 into the ambient atmosphere, until such time as the pressure in vessels C and F is lowered to the second pressure.

The first liquid phase in vessels C and F tends to separate into two strata of oil and water, due to the elevated temperature to which the phase is subjected in these vessels. The oil, of course, floats on top of the water, and the oil is preferably discharged from the auxiliary vessel. The water strata is preferably withdrawn from vessel C by means of a tube 92 that is in communication with the interior thereof, as may best be seen in FIGURE 1. Vessel C is provided with a tube 96 that extends downwardly therefrom and is connected to a normally closed drain cock 98.

The glycol or other liquid-removing material in the fourth vessel E absorbs moisture from the gas as it bubbles therethrough, and it is therefore desirable that this liquid-absorbing material be constantly recirculated to remove moisture therefrom. Removal of moisture from the liquid-absorbing material is conveniently accomplished by means of a conventional gas-fired reconcentrator 100 that heats the liquid sufficiently to vaporize any moisture which had been dissolved therein, which moisture is discharged as steam through a tube 102 into the ambient atmosphere. The liquid moisture-absorbing material is withdrawn from the fourth vessel E through a tube 104 that extends through the end 106 of the fourth vessel. Tube 104 is connected to the suction side of a pump 108, as may be seen in FIGURE 1. A tube 110 leads from the discharge side of pump 108 to the reconcentrator 100. Fluid is discharged from pump 108 to flow through the reconcentrator 100, and as the fluid discharges from the reconcentrator it flows through a tube 112 to return to the fourth vessel E. Pump 108 is driven by a motor 114 which is driven by gas at the first pressure existing in vessel A. A tube 116 extends from the upper portion of the dome 56 and conducts gas at this first pressure to a T 118, which T has two tubes 120 and 122 extending therefrom. Tube 122 is connected to motor 114 to permit gas from dome 56 to drive the same. Pump 108 is driven by motor 114 to recirculate the moisture-absorbing liquid previously mentioned. After gas enters the motor 114 and causes rotation thereof, the gas discharges into a tube 124 that is connected to a tube 126 which extends upwardly and is connected to the upper interior portion of the auxiliary vessel F.

This gas which was used at the first pressure in actuating motor 114 is not wasted, but is discharged to vessel F at a lower pressure and flows therefrom through the tube 76. The T connection 78 (FIGURE 1) is connected to a tube 128 that extends to another T 130, one leg of which is connected to the valve 72, with the other leg being connected to a tube 132 extending to the thermostatically controlled valve 36. Gas is supplied to the burners 70 and 32 from the upper portion of the auxiliary vessel F, which gas may either be occluded gas that escapes from the first liquid phase when in the third vessel C and auxiliary vessel F, or gas that has separated in the first vessel A and passed therefrom through dome 56 and tube 116 to motor 114. After causing rotation of motor 114, this gas passes through tubes 124 and 126 to enter the confines of vessel F.

The separated oil in vessels C and F discharges therefrom through tube 84 to a storage tank (not shown). Occasionally small quantities of water may be carried with this oil. Accordingly, it is desirable to circulate the oil from the storage tank back to vessel F to permit separation of any water therefrom that may be therein. A suction line 134 leads to the storage tank (not shown) and which is connected to the suction of a second pump 136. The oil from the storage tank and any water associated therewith discharges from pump 136 through a line 138 that is connected to the interior of the third vessel C. Pump 136 is driven by a second motor 140 that receives gas under the first pressure from tube 120, previously identified. After actuating motor 140, the gas discharges into tube 126 at a lower pressure and is directed by this line into the upper portion of the auxiliary vessel F, as shown in FIGURE 1.

From the above description of the preferred form of the present invention, it will be seen that all of the gas occluded or carried with the well fluid as it discharges from the well head is either separated as gas for commercial use and discharged through pipe 48, utilized in either driving the motors 114 and 140, or used in firing the burners 32 or 70. The only gas discharged into the ambient atmosphere is that contained in the auxiliary vessel F which is momentarily discharged therefrom when the pressure in this vessel rises above the second pressure, whereby the pressure relief valve 82 opens and discharges a small quantity of the gas. It will be particularly noted that only a small amount of gas need be discharged into the ambient atmosphere through valve 82 to return the pressure in vessels F and C to the second pressure normally maintained therein.

As gas discharges from the tube 48 it is at a first pressure which is higher than that in the gas transmission line, gas storage tank, or other facility to which this gas is discharged. Accordingly, during operation of the preferred form of the invention, the first temperature at which the first liquid phase is heated is less than the temperature to which the first liquid phase is heated by the heater tube 66 when situated within the confines of the third vessel C. Therefore, the heat exchanger 12 and heater tube 24 in first vessel A serve only to preheat the first liquid phase prior to its discharge into third vessel C where the temperature thereof is raised to a second temperature which is higher than that of the first.

The flow of the well fluid through pipe 10, heat exchanger 12 and tube 14 to the expander 18 may be at any pressure, but it must be somewhat higher than the gas pressure existing at the location where gas from the fourth vessel E is discharged. However, the second pressure within the confines of the third vessel C and auxiliary vessel F need be only sufficient to cause the flow of the oil therefrom through tube 84 to the storage tank (not shown). To conserve heat, it is desirable to provide a vertical rectangular enclosure 139, one section of which is shown in the right-hand upper portion of FIGURE 1. Enclosure 139 encompasses the first, second, third, fourth vessels A, B, C and E respectively, as well as the auxiliary vessel F, reaching to a height of at least the upper portions thereof.

The first pump 108 and second pump 136 are mounted on bases 150 and 152, respectively, which are connected to a skid or other platform 154. The tube 44 through which gas discharges from the interior of the second vessel B to the fourth vessel E, serves as a cooling coil if extended above the upper limits of enclosure 139. Flow of gas through tube 116 to the first motor 114 and second motor 140 is controlled by two valves 115 and 149 respectively. From experience in operating the preferred form of the invention, it has been found desirable to maintain the temperature within the confines of the second vessel B as close to 39.2° F. as possible.

Figure 2:
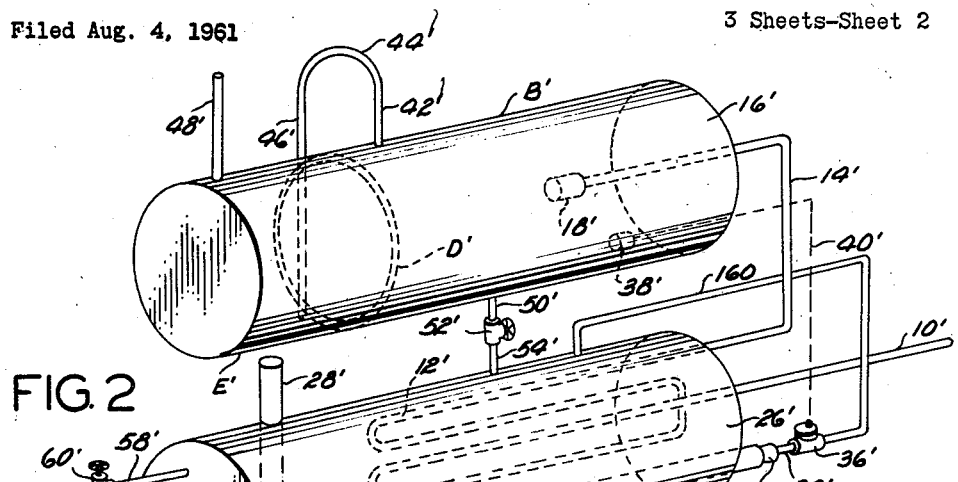
FIGURE 2 is a perspective view of a first alternate form of the invention that may be used to effect separation of gas from a well fluid not containing oil in saleable quantity.

In FIGURE 2 a compact unit is shown that is particularly adapted for use in drying a flowing gas stream from a producing well that does not contain a saleable quantity of oil. Many gas wells discharge substantial quantities of water, but no appreciable oil is contained in the flow. Therefore, to use a second stage recovery method as shown and described in connection with the preferred form of the invention would serve no useful purpose, but would simply be an added expense.

The first alternate form of the invention is illustrated in FIGURE 2 and includes a first closed vessel A' and second closed vessel B', which by means of a transverse portion D' positioned therein is divided to provide a closed vessel E'. Vessels A' and B' may be structurally identical to vessels A and B of the preferred form of the invention. A number of components utilized in the first alternate form of the invention are identical in structure to corresponding components of the preferred form of the invention, which are therefore identified by the same numeral but with a prime being added thereto.

The gas stream flow containing water but no saleable quantity of oil, is discharged from the well into a pipe 10' that is connected to a coiled heat exchanger tube 12' situated within the confines of the first vessel A'. The heat exchanger tube 12' is connected by a tube 14' that extends upwardly through an end 16' of the second vessel B' to terminate within the confines thereof in an expander 18'. An inverted U-shaped tube 44' is provided, one leg 42' of which is connected to the upper interior of the second vessel B', with the second leg 46' thereof extending downwardly in the fourth vessel E' to a position substantially near the lower interior surface thereof. A tube 48' extends upwardly from vessel E' and is connected to the upper interior portion thereof. Tube 48' serves to discharge dry gas from the interior of the fourth vessel E' after it has bubbled upwardly through a moisture-absorbing liquid contained within the confines thereof. If desired, the moisture-absorbing liquid may be recirculated as described in connection with the preferred form of the invention to continuously remove moisture that has been absorbed by this liquid. Vessel B' has a tube 50' connected to the lower interior portion thereof, which extends to a valve 52'.

Valve 52' is connected to a tube 54' that leads downwardly and is connected to the upper interior portion of vessel A'. A heater tube 24' extends through an end 26' of vessel A' and develops into a stock 28' that projects upwardly out of this vessel and located adjacent a second end 30' thereof. A tube 58' communicating with the interior of vessel A' projects from the second end 30' thereof. Tube 58' extends to a valve 60', which in turn is connected to a tube 62' that serves to conduct water separated from the gas stream to a desired location, apart from that in which the first alternate form of the invention is located. The heater tube 24' is provided with a gas burner 32' which is connected by a tube 34' to a thermostatically controlled valve 36'.

A tube 160 is connected to the upper interior portion of vessel A' and extends to the intake to the valve 36'. Valve 36' is preferably actuated by a thermostat 38' situated within the confines of the second vessel B' and connected to the thermostatically controlled valve 36' by conventional means 40' shown in dotted line in FIGURE 2. It is desirable to maintain the interior of the second vessel B' at a first temperature, but when it rises above this predetermined temperature the thermostat 38' causes valve 36' to reduce the rate of gas flow to burner 32' whereby the gas stream flow discharging from expander 18' will not be heated to as high a degree, and in expanding will cool the interior of the vessel, tending to return the temperature of the interior of vessel B' to the desired first temperature. In the event the temperature within vessel B' falls below the desired first temperature, the above-described operation is reversed.

As the oil well stream discharges from the expander 18' into second vessel B' it separates into gas at a first liquid phase that contains water and occluded gas. This first phase at a first pressure that is maintained in vessel B' flows downwardly through the tubes 50' and 54' into the confines of vessel A' where it is further heated, and the occluded gas escapes therefrom through tube 160 to the burner 32' to heat the first phase of the liquid in vessel A'. The first pressure maintained in vessel B' is, of course, dependent on the back pressure that is maintained on the gas as it escapes from the fourth vessel E' through the tube 48'. After the occluded gas has escaped, water is discharged through the tube 58', valve 60' and tube 62' to a location (not shown) remote from the site of the first alternate form of the invention. If desired, this alternate form of the invention can be mounted on a skid or other platform (not shown) to permit it to be moved from place to place, or easily and conveniently transported from one field to another by truck.

Figure 3:
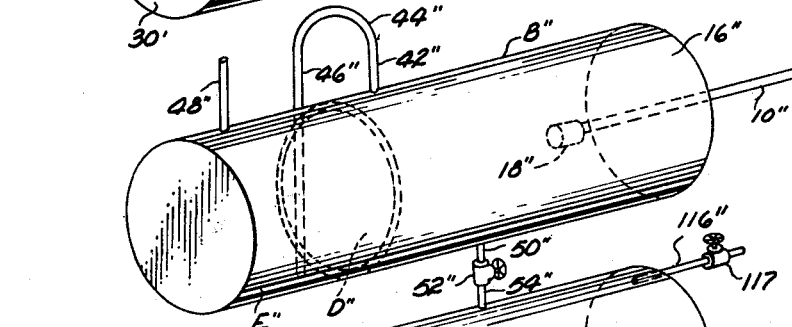
FIGURE 3 is a perspective view of a second alternate form of the invention which is used to effect separation of oil, gas and water in a well fluid that is under a pressure but slightly higher than that at which the separated gas must be discharged from the apparatus.

A second alternate form of the invention is shown in FIGURE 3 that is particularly adapted for use when the flow of pressure of the fluid stream from a producing well is but slightly higher than the pressure at which gas will be discharged from the device to a location apart from the location of the second alternate form of the invention. Those components of the second alternate form of the invention which are identical to components in the first alternate form are identified by the same numerals and letters used in the description of the second alternate form, but to which a double prime has been affixed.

Referring to FIGURE 3, it will be seen that in the second alternate form a first vessel A" and a second vessel B" are provided. By use of a transverse partition D" vessel B" is divided to provide a vessel E" in which a moisture-absorbing liquid is contained. An inverted U-shaped tubular member 44" extends from vessel B" to vessel E" and serves the same function as tube 44' in the first alternate form of the invention. A tube 48" extends from the upper interior portion of vessel E" and serves to conduct gas after it has bubbled upwardly through the moisture-absorbing liquid to a location remote from that of the second alternate form of the invention.

A tube 50" leads downwardly from the lower portion of vessel B" to a valve 52" from which a tube 54" extends to the upper interior of the first vessel A". An expander 18" is situated within the confines of the second vessel B" (FIGURE 3) from which a line 10" extends through an end 16" of the vessel to the well head. Due to the low differential in pressure existing between the well fluid at the well head and that in the interior of the second vessel B", it is not desirable to offer appreciable resistance to this flow, for otherwise there would not be a sufficient differential in pressure between the fluid and gas associated therewith as it discharges into vessel B" to force the gas that is separated therefrom outwardly through the tubing 48" to the desired location. As the stream of fluid from the well head discharges through the expander 18", it separates into gas which passes into vessel E" and a liquid phase containing both water, oil and occluded gas which flows downwardly from the second vessel B" into the first vessel A".

After the first liquid phase flows into vessel A" it separates into a strata of water that lies in the lower portion of the vessel, and a second strata of oil which floats thereon, with the occluded gas escaping from these two strata to occupy a position in the uppermost portion of vessel A". As the water separates from the first liquid phase in vessel A", it discharges therefrom through a tube 92", with the oil passing through tube 84". Two valves 93 and 85 control the flow of water and oil through the tubes 92" and 84" respectively. The occluded gas which separates from the first liquid phase in the first vessel A" flows therefrom through tube 116" that is connected to the upper interior of the vessel. Flow of fluid through tube 116" is controlled by a valve 117 connected thereto.

Should it be desired, means can be provided in both the first and second alternate forms of the invention to withdraw the liquid-absorbing material from the vessel E" and recirculate this liquid to remove moisture therefrom in the same manner as shown in detail in FIGURE 1 and described in connection with the structure and operation of the preferred form of the invention.

There are some producing wells from which only small quantities of oil are intermittently discharged. This oil and associated water is usually in the form of an emulsion, and is discharged to a tank (not shown) where the oil and water eventually separate into separate strata. However, in many instances this separation is an extremely slow process, and a small treater is actually needed to effect a clean separation between the water and oil. Such a treater, even though small, requires an outside supply of gas for this purpose involving the laying of an extensive amount of piping to an available gas source. This is not only inconvenient, but expensive and time-consuming.

Figure 4:
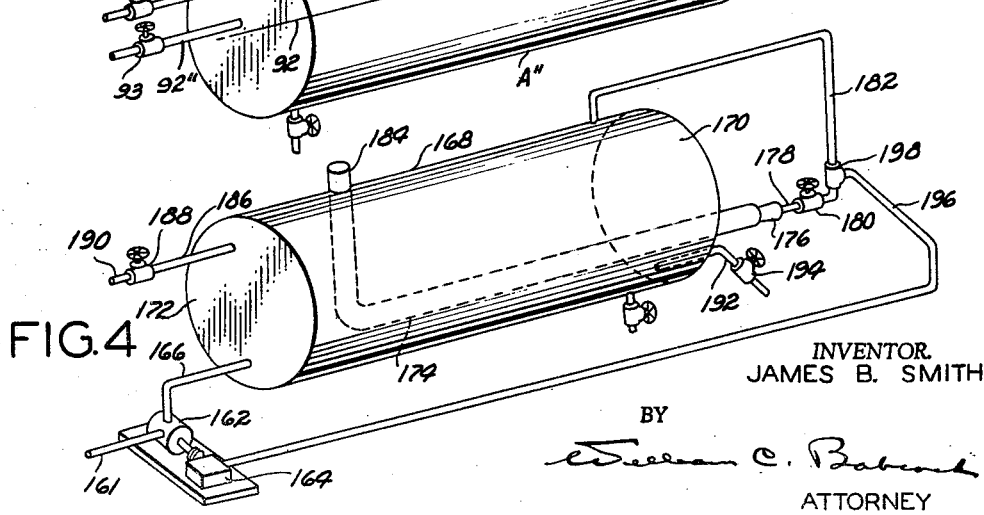
FIGURE 4 is a perspective view of a third alternate form of apparatus for separating a well fluid into oil and water, using the occluded gas therein for powering the apparatus during operation thereof.

A unit is shown in FIGURE 4 that is particularly adapted for effecting a separation of liquid from a separating tank that will normally include comingled oil, gas and water, with the major portion of the gas being in an occluded state. A tube 161 extends from a separating bracket (not shown) to receive the oil strata that has separated from the liquid in the tank, and is connected to the suction side of a pump 162 that is rotated by an internal combustion engine 164 capable of operating on gas. A tube 166 projects from the discharge side of pump 162, and is in communication with the lower portion of a closed cylindrical vessel 168. Vessel 168 has two ends 170 and 172 respectively. A heater tube 174 is located in the lower portion of vessel 168 and projects through the end 170 thereof. The outer end of heater tube 174 is provided with a burner 176 capable of burning gas delivered thereto, which is supplied through a tube 178 that is connected to a valve 180. Valve 180 is connected to a tube 182 that extends upwardly and communicates with the uppermost interior of vessel 168 as shown in FIGURE 4. That end of heater tube 174 adjacent the end 172 of vessel 168 develops into an upwardly extending stack 184 that projects upward above vessel 168. Heater tube 174 serves to heat the liquid discharged into vessel 168 through tube 166, thereby the occluded gas tends to separate from this liquid and rise to the upper interior portion of vessel 168. The occluded gas passes outwardly from the upper portion of the vessel 168 through the tube 182, valve 180, tube 178, to the burner 176 where it is consumed by combustion to heat the tube 174.

Due to the heat applied to the liquid within the confines of vessel 168, it separates into two stratas of oil and water, with the oil floating on the upper surface of the water. The oil is discharged from vessel 168 under pressure through a tube 186 having a back pressure valve 188 connected thereto. After the fluid passes the valve 188, it discharges through tubing 190 to the separating tank (not shown). The water that separates from the first phase within the vessel 168 can discharge from the vessel through a tube 192 that is in communication with the lower portion thereof. A back pressure valve 194 is preferably connected to tube 192 so that a positive pressure is at all times maintained on the gas in vessel 168 that has escaped from the liquid discharged therein. The third alternate form of the invention shown in FIGURE 4 can be mounted on a skid or other suitable platform for convenient movement thereof about a field, or from one field to another, in the same manner as the preferred form of the invention shown in FIGURE 1.

The gas is supplied to the internal combustion engine 164 by a tubing 196 that extends from a T connection 198 in the tube 182 (FIGURE 4). The gas passing into the internal combustion engine 164 is, of course, consumed by combustion therein.

A fourth alternate form of the invention is shown in FIGURE 5, the operational advantages and merits of which resides in the fact that it employs but a single heater, and is simpler in construction, more compact and lighter in weight than the preferred form of the invention shown in FIGURE 1. This fourth alternate form of the invention includes a first closed vessel J and a second closed vessel K in which a transverse partition L is formed that serves to provide a fourth closed vessel M therein. Should it be desired, the second closed vessel K and fourth closed vessel M may be separate vessels rather than being integrally formed as a single unit.

The fourth alternate form of the invention also includes a third closed vessel N. Vessels J, K and N are preferably cylindrical, with the second vessel K being situated above the first vessel J and parallel thereto. The third vessel N is parallel to first vessel J, located to one side thereof below the second vessel K. It will be obvious that these vessels may be arranged in different spaced relationship and of different configuration if desired. Vessels J, K, and N, as well as the appurtenances associated therewith, are adapted to be mounted on the skid 154 which is not shown in FIGURE 5 but is illustrated in FIGURE 1. Skid 154 or other suitable platform serves as a base for the fourth alternate form of the invention to assist in moving the invention from location to location in a field, or transporting it from one field of producing wells to another.

A stream of fluid from a producing well that is under substantial pressure is discharged from the well head (not shown) through a tube 200 to a T connection 202. The fluid discharged from the well under pressure will contain comingled water, oil and gas, normally in the form of an emulsion, with the well fluid normally containing a substantial percentage of gas in the occluded state. The second vessel K is provided with two ends 204 and 206. An expander 208 is situated within the confines of vessel K adjacent the end 204, as illustrated in FIGURE 5. Expander 208 is connected to a tube 210 that extends outwardly through the end 204. Tube 210 extends to a T connection 212. A tube 214 is connected to the T 212 that leads to a valve 216, which valve by means of tubing 218 is connected to the T 202. The T 202 (FIGURE 5) is connected by tubing 220 to a valve 222 from which tubing 224 extends.

As will be seen in FIGURE 5, the third vessel N has two ends 226 and 228. A heat exchanger 230 in the form of a number of tubular coils is situated within the confines of the third vessel N. One end of the heat exchanger 230 is connected to tubing 224, and the other end of this exchanger is connected to tubing 232 that extends to the T 212. A heater tube 236 is provided that projects through the end 226 of the third vessel N and proceeds longitudinally along the lower interior portion thereof to develop into an upwardly projecting stack 238, adjacent the end 228 of vessel N. A burner 240 is connected to the outer portion of heater tube 236 and is connected to a valve 242. Tubing 244 extends from valve 242 to a T connection 246. T 246 is connected to tubing 248 that extends upwardly from the upper interior of vessel N, as may be seen in FIGURE 5. The T 246 is also connected to tubing 250 that leads to a pressure relief valve 252. When the pressure of gas contained in tubing 250 exceeds a predetermined pressure, the valve 252 opens to permit discharge of this gas at excessive pressure into the ambient atmosphere through tubing 254.

Second vessel K is provided with a tube 256 that leads downwardly therefrom toward vessel J and is connected to a back pressure valve 258, which in turn is connected by 260 to the upper interior portion of the first vessel J. An inverted U-shaped tubular 262 is provided, one leg 264 of which communicates with the upper interior portion of the second vessel K, with a second leg 266 thereof extending downwardly through the upper interior portion of the fourth vessel M, to terminate a short distance above the lower interior portion of the fourth vessel.

The fourth vessel M contains a liquid moisture-absorbing material such as glycol, and as gas is discharged into this glycol from leg 266, it bubbles upwardly therethrough whereby the moisture is removed therefrom. After the gas has bubbled upwardly through the glycol, it discharges through a tube 268 to a location remote from that of the fourth alternate form of the invention. The gas at this remote location is discharged into a gas transmission line, storage facilities, or is used for other commercial purposes. It will be apparent that the pressure at which the gas is discharged from vessel M into tube 268 must be greater than the pressure of gas at the remote location where it will be used in order that the gas can be discharged into the transmission lines or storage facilities.

As the well fluid discharges from expander 208 as a spray, it separates into gas at a first liquid phase containing oil, water and occluded gas. This first liquid phase falls to the bottom of the second vessel K by force of gravity and can flow therefrom through the tube 256 at a rate determined by the position of valve 258. As the well fluid and gas is discharged through the expander 208, the gas expands to a first pressure that is less than the pressure on the fluid as it flows to the expander through tube 210. This expansion of the gas results in cooling of the interior of vessel K. This cooling is preferably sufficient to lower the temperature of the discharging fluid to the new point of the components therein, with the components assuming the liquid state and being included in the first liquid phase that drops to the lower portion of vessel K. If there is too high a differential in pressure between the fluid as it flows through the tubing 210 to the expander 208, and the pressure existing within the interior of vessel K, so much heat may be absorbed by the gas as it expands in the second vessel that the liquid associated therewith and discharged through the expander 208 will be frozen.

The well fluid discharged from different wells in a producing field may vary in temperature, and in some wells wherein the discharged liquid ranges in temperature from warm to hot, no auxiliary heating of the fluid as it discharges through the expander 208 will be required to keep the liquids that separate from the gas in the second vessel from freezing. When such a situation occurs, the valve 222 is placed in the closed position and the fluid is discharged from the tube 200 through the T connection 202, tubing 218, valve 216, and tube 214 into the tubing 220, to discharge through the expander 208. When the valve 222 is in the closed position, flow of fluid through the tubing 232 towards the heat exchanger 230 is prevented by means of a check valve 270 positioned in the line 232 as shown in FIGURE 5.

If the liquid discharged from a producing well through the tubing 200 is at a sufficiently low temperature to require heating prior to discharge thereof through the expander 208, the valve 216 may be closed, valve 222 opened, and the well fluid discharged through tubing 224, heat exchanger 230, tubing 232, check valve 270, T 212, and tubing 210 to the expander 208. Frequently it is found that the well fluid discharged into the tube 200 is of such temperature that all of the fluid need not be heated, and as a result the valves 216 and 222 are both partially opened to permit a certain percentage of the well fluid to pass through the heat exchanger whereby the balance of the fluid may pass directly into the tube 210 through the tubing 218, valve 216 and tube 214. In this manner, a blend of heated fluid and cold fluid is obtained in the tube 210 that is of a temperature required to obtain optimum separation of the fluid into gas and a first liquid phase as it discharges into the second vessel K. The first liquid phase that separates in vessel K can flow downwardly through the tube 256, valve 258, and tubing 260 into the first vessel J where the pressure of the liquid may be maintained at a second pressure that is lower than that existing in the second vessel K.

The pressure existing in vessel K is dependent on the rate at which the gas is permitted to discharge through the tube 268, and the back pressure that is maintained on the gas in the fourth vessel M. The magnitude of the first pressure within vessel K is also determined by the rate at which well fluid is discharged into vessel K through the expander 208, the pressure at which the well fluid is discharged through the expander, and the rate at which gas separates from the well fluid within the confines of the second vessel.

The temperature within the second vessel K is, of course, dependent on the cooling effect achieved by expansion of the gas from the expander 208 therein, and this in turn is dependent on the magnitude of the preheating of the well fluid before it is discharged through the expander. From the above description, it will be apparent that it is possible to maintain a relatively close control over the interior temperature of the second vessel K as well as the first pressure that is maintained therein.

The first liquid phase minus the occluded gas that has separated therefrom within the confines of the first vessel J can flow outwardly from vessel J through a tube 280 which projects from an end 282 of the vessel. The tube 280 extends to a back pressure valve 284 having a tube 286 extending therefrom to the interior portion of the third vessel N. After the first liquid phase enters vessel N it is heated to a second temperature by the heater tube 236 which is higher than that of the first liquid phase when in the first vessel J. Due to this increase in temperature of the first liquid phase, additional occluded gas still remaining with the first liquid phase separates therefrom and rises to the upper portion of the third vessel. The occluded gas that separates from the first liquid phase in the third vessel N discharges through the tubing 248 and 244, valve 242, into burner 240, and is consumed by combustion to heat the tube 236 and the first liquid phase contained in the vessel N as well as the heat exchanger 230.

The interior of the third vessel N can be maintained at a second temperature substantially higher than the temperature in either the first vessel J or second vessel K. Due to this increased second temperature, substantially all of the occluded gas is discharged from the first liquid phase within the confines of the vessel N, and is subsequently used for heating, or heating a portion of a reconcentrator 288 that is identical in construction to the reconcentrator 100 shown in FIGURE 1 and described in connection with the operation of the preferred form of the invention. The gas is supplied to the reconcentrator 288 by a tubing 290 that leads therefrom to a T connection 292 which is connected to the tubing 244 and T 246 as shown in FIGURE 5.

The moisture-absorbing liquid in the fourth vessel M is withdrawn therefrom by tubing 296 which is in communication with the interior of the fourth vessel and extends to the suction side of a pump 298. A discharge side of pump 298 is connected to tubing 300 that extends to the reconcentrator 288 and discharges the liquid therethrough to be heated and have moisture dispelled therefrom into the ambient atmosphere through tubing 302. After moisture has been removed therefrom in the reconcentrator 288, the liquid is discharged through tubing 304 to the upper interior portion of vessel M, as best seen in FIGURE 5. The first vessel J is provided with an upwardly extending dome 306 in which the separated gas collects, which dome is connected to one side of a motor 310 by tubing 308. After passing through the motor 310 to rotate the pump 298, gas discharges therefrom into tubing 312 that is connected with the upper interior portion of the third vessel N.

Thus it will be seen that in the operation of the fourth alternate form of the invention, the gas discharged with the fluid from the well head (not shown) is either reclaimed and discharged through the tube 268 to a location where it is utilized for commercial purposes, and the gas occluded with the well fluid is used to either operate the motor 310, or discharged from the third vessel N to the burner 240 to be used in raising the temperature of the first liquid phase in the third vessel to the second temperature previously mentioned. The only portion of the gas that is lost is that which may escape through the pressure relief valve 252 when the pressure within vessel N rises above a third predetermined pressure.

Oil discharges from vessel N through a pipe 227 and water through a pipe 229, as may be seen in FIGURE 5.

The detailed structure of the expander 18 is shown in FIGURE 6. The tube 14 has a circumferentially extending flared end 314 in which a ball 316 is adapted to seat. A cage 318 that is substantially open extends outwardly from the seat 314 and serves as a guide to movably support the ball 316. A compressed helical spring 320 abuts against the outer end 322 of the cage and on the opposite end contacts the ball 316, which at all times tends to hold the ball in abutting contact with seat 314. When the pressure on the fluid in tubing 14 exceeds the force exerted by the compressed spring 320, the ball 316 moves outwardly from the seat 314 to permit gas and fluid to discharge as a spray from the tubing 14 and impinge on the baffles 20 and 22. It will be obvious that expanders other than that shown and described in connection with FIGURE 6 may be successfully used in conjunction with the preferred, and the first, third and fourth forms of the invention.

The method of operating the invention has been described in detail hereinabove and need not again be repeated.

Although the present invention is fully capable of achieving the objects and providing the advantages hereinbefore mentioned, it is to be understood that it is merely illustrative of the presently preferred embodiments thereof and I do not mean to be limited to the details of construction herein shown and described, other than as defined in the appended claims.

I claim:

1. An apparatus for separating oil, water and gas from a stream of well fluid under pressure that substantially all of said gas may be utilized, comprising: first, second and third closed vessels; first means for discharging well fluid being separated into oil, water and gas into said second vessel; second means for permitting gas to discharge from said second vessel to an area remote from said apparatus at a sufficiently rapid rate that the pressure in said second vessel is less than the pressure on said fluid as it enters said second vessel, with said gas in said fluid stream expanding and tending to separate therefrom; third means that are gas-operated for heating at least a portion of said fluid to prevent freezing of said fluid as said gas expands in said second vessel and for heating said fluid in said first vessel to a first temperature at which said fluid tends to stratify into layers of water and oil, which first temperature is higher than the temperature in said second vessel; fourth means for discharging said fluid from said second vessel into said first vessel; fifth means for discharging gas from said first vessel into said third vessel at a sufficiently rapid rate that a first pressure is maintained in said first vessel that is lower than said pressure in said second vessel to permit additional gas to be separated from said fluid while in said first vessel; sixth means for discharging said fluid from said first vessel into said third vessel; seventh means for discharging gas from said third vessel to said third means at a sufficiently rapid rate that a second pressure is maintained in said third vessel which is lower than said first pressure for separating further gas from said fluid in said third vessel; eighth means that are gas-operated for heating said fluid in said third vessel to a second temperature at which optimum separation of water and oil therein occurs, which eighth means is supplied with gas from said seventh means; and ninth means for withdrawing water and oil from said third vessel after said fluid therein has divided into separate strata thereof.

2. An apparatus as defined in claim 1 wherein said third means is disposed in the interior of said first vessel to heat said fluid therein to said first temperature.

3. An apparatus as defined in claim 1 which further includes: a fourth vessel, the lower interior portion of which is connected to the upper interior of said second vessel by said second means; a moisture-absorbing liquid contained in said fourth vessel; eleventh means for discharging gas from said fourth vessel at a rate sufficiently rapid to cause the pressure in said fourth vessel to be lower than the pressure in said second vessel, which gas as it discharges through said eleventh means is substantially free of moisture due to contact with said liquid; twelfth pump means for circulating said liquid out of and back into said fourth vessel, with said tenth means being a motor that operates on gas at said first pressure and drives said pump means; thirteenth gas-fired means for removing moisture from said liquid during circulation thereof; and fourteenth means for supplying gas from said seventh means to said thirteenth means.

4. An apparatus as defined in claim 1 wherein said third means heats said first vessel, together with said fluid therein, to increase the rate at which said gas under said first pressure separates from said fluid in said first vessel.

5. An apparatus as defined in claim 1 wherein said third means comprise heat exchanger tubes within said first vessel, together with a gas burner disposed in indirect heat relation with said fluid within said first vessel, which burner heats said fluid in said first vessel to increase the rate at which said gas under said first pressure separates therefrom, with said heat exchanger tubes being in communication with said first means and said fluid as it flows through said heat exchanger tubes is heated by heat supplied thereto from said heated fluid in said first vessel.

6. An apparatus as defined in claim 3 which further includes an upwardly extending tubular member fabricated from a heat-conducting material which connects the upper interior portion of said second vessel to the lower interior portion of said fourth vessel, with said gas as it flows through said tubular member being cooled due to loss of heat through said material defining said tubular member into the ambient atmosphere.

7. An apparatus for so separating gas and water from a stream of fluid under pressure that substantially all of said gas may be utilized, comprising: first and second closed vessels; first means for discharging said fluid stream into said second vessel as a spray; second means for permitting discharge of gas from said second vessel at a rate sufficiently rapid that the pressure in said second vessel is lower than the pressure on said fluid stream as it enters said second vessel to cause said gas in said stream to expand and tend to separate therefrom; third gas-operated heater means capable of heating at least a portion of said fluid stream prior to discharge thereof into said second vessel to prevent freezing of said fluid stream as said gas expands in said second vessel and for heating said fluid as it discharges into said first vessel as hereinafter recited to a temperature at which optimum separation of gas from said fluid occurs; fourth means for discharging said fluid from said second vessel into said first vessel; and fifth means for permitting gas to discharge from said first vessel at a sufficiently rapid rate that a first pressure is maintained in said first vessel that is lower than said pressure in said second vessel to permit additional gas to be separated from said fluid while in said first vessel, with said fifth means supplying gas to said third means.

8. An apparatus as defined in claim 7 wherein said third means further includes heat exchanger tubes within said first vessel, together with a gas burner disposed in indirect heat relation with said fluid within said first vessel, which burner heats said fluid in said first vessel to increase the rate at which said gas under said first pressure separates therefrom, with said heat exchanger tubes being in communication with said first means and said fluid as it flows through said heat exchanger tubes being by heat supplied thereto from said heated fluid in said first vessel.

9. An apparatus for separating oil, water and gas from a body of fluid comprising: a closed vessel; a pump having suction and discharge openings; first conduit means that establishes communication between said body of fluid and said suction opening; second conduit means that establishes communication between said discharge opening and the interior of said vessel; gas-fired means for heating the interior of said vessel; a motor capable of being actuated by gas under pressure, which motor is drivingly connected to said pump; third conduit means that establishes communication between the upper interior of said vessel, the gas-fired means, and the motor, to actuate said motor and cause said pump to discharge fluid from said body of fluid into said vessel and to transmit gas to said gas fired means to heat said fluid in said shell to cause separation of gas therefrom and permit said liquid to separate into strata of oil and water; means for discharging said separated oil from said vessel; and means for discharging said separated water from said vessel.

References Cited by the Examiner

UNITED STATES PATENTS

| | | | |
|---|---|---|---|
| 2,214,368 | 9/40 | Greenfelder et al. | 55—195 |
| 2,221,169 | 11/40 | Raney et al. | 55—46 |
| 2,457,959 | 1/49 | Walker | 55—175 |
| 2,735,506 | 2/56 | Glasgow | 55—32 |
| 2,780,304 | 2/57 | Pew et al. | 55—45 |
| 2,863,522 | 12/58 | Smith | 55—171 |
| 2,869,676 | 6/62 | Lagucki | 55—169 |
| 2,948,352 | 8/60 | Walker et al. | 55—175 X |
| 3,040,499 | 6/62 | May | 55—175 |
| 3,043,072 | 7/62 | Walker et al. | 55—175 |
| 3,119,674 | 1/64 | Glasgow et al. | 55—32 |

REUBEN FRIEDMAN, *Primary Examiner.*

HARRY B. THORNTON, *Examiner.*